United States Patent [19]

Arakawa

[11] Patent Number: 4,502,281
[45] Date of Patent: Mar. 5, 1985

[54] FLUID RESERVOIR

[75] Inventor: Susumu Arakawa, Chiryu, Japan

[73] Assignee: Aisin Seiki Kabushiki Kaisha, Kariya, Japan

[21] Appl. No.: 389,495

[22] Filed: Jun. 17, 1982

[30] Foreign Application Priority Data

Jun. 26, 1981 [JP] Japan ............................. 56-93879[U]

[51] Int. Cl.³ .................................................. B60T 11/26
[52] U.S. Cl. .......................................... 60/585; 60/592
[58] Field of Search .................................. 60/585, 592

[56] References Cited

U.S. PATENT DOCUMENTS

| | | | |
|---|---|---|---|
| 2,582,896 | 1/1952 | Acton | 60/585 |
| 3,247,670 | 4/1966 | Bauman | 60/585 |
| 4,168,613 | 9/1979 | Nakagawa | 60/592 |
| 4,217,922 | 8/1980 | Come | 60/592 |
| 4,337,792 | 7/1982 | Nomura | 60/592 |
| 4,385,495 | 5/1983 | Kubota | 60/592 |

FOREIGN PATENT DOCUMENTS

| | | | |
|---|---|---|---|
| 13072 | 2/1977 | Japan | 60/592 |
| 19059 | 2/1979 | Japan | 60/585 |
| 112401 | 8/1980 | Japan | 60/585 |
| 109435 | 12/1943 | Sweden | 60/585 |

Primary Examiner—Abraham Hershkovitz
Attorney, Agent, or Firm—Burns, Doane, Swecker and Mathis

[57] ABSTRACT

A fluid reservoir for supplying fluid to a master cylinder arranged in hydraulic system of an automotive vehicle comprises a reservoir tank having at least one fluid chamber therein and is provided at lower portion thereof with at least one outlet which is offset from a center of the fluid chamber and supplies fluid within the fluid chamber to the master cylinder. The fluid chamber is divided by partition wall into larger and smaller chambers the latter of which is in free fluid communication with the outlet and is in free fluid communication at top thereof with the larger chamber. The smaller chamber is much smaller than larger chamber in both longitudinal and transverse directions of the vehicle. The partition wall is provided with a passage for establishing a restricted normal fluid communication between the larger and smaller chambers.

2 Claims, 2 Drawing Figures

FLUID RESERVOIR

BACKGROUND OF THE INVENTION

1. Field of the Invention

The present invention relates to a fluid reservoir and more particularly to a fluid reservoir for supplying a fluid to at least one master cylinder arranged in a hydraulic system of an automotive vehicle.

2. Description of the Prior Art

In a conventional fluid reservoir comprising a tank having at least one fluid chamber and at least one outlet which is offset from a center of the fluid chamber and is in direct free fluid communication with the fluid chamber, it is often experienced that a fluid level in the fluid chamber falls below the outlet due to varying of the fluid level upon travelling of the vehicle, so as to thereby cause to enter the air within the reservoir into the outlet. The air entered into the outlet may be sucked into a hydraulic system by operation of a master cylinder fluidly connected to the outlet thereby causing troubles on the hydraulic system.

SUMMARY OF THE INVENTION

An object of the present invention is, therefore, to provide a new and improved fluid reservoir which obviates the prior drawbacks mentioned above.

More particularly, it is an object of the present invention to provide a new and improved fluid reservoir wherein a partition wall is provided within a reservoir tank for dividing a fluid chamber defined within the reservoir tank into larger and smaller fluid chambers the latter of which is in free fluid communication with the outlet and is in free fluid communication at an upper end thereof with the larger chamber, and the smaller chamber is much smaller that the larger chamber in both longitudinal and transverse directions of the vehicle and is in restricted normal fluid communication with the larger chamber through a passage formed in the partition wall.

BRIEF DESCRIPTION OF THE DRAWINGS

Various other objects, features and attendant advantages of the present invention will be evident from the following detailed description upon consideration of the drawings wherein.

DETAILED DESCRIPTION OF THE PREFERRED EMBODIMENT

Figure 1:
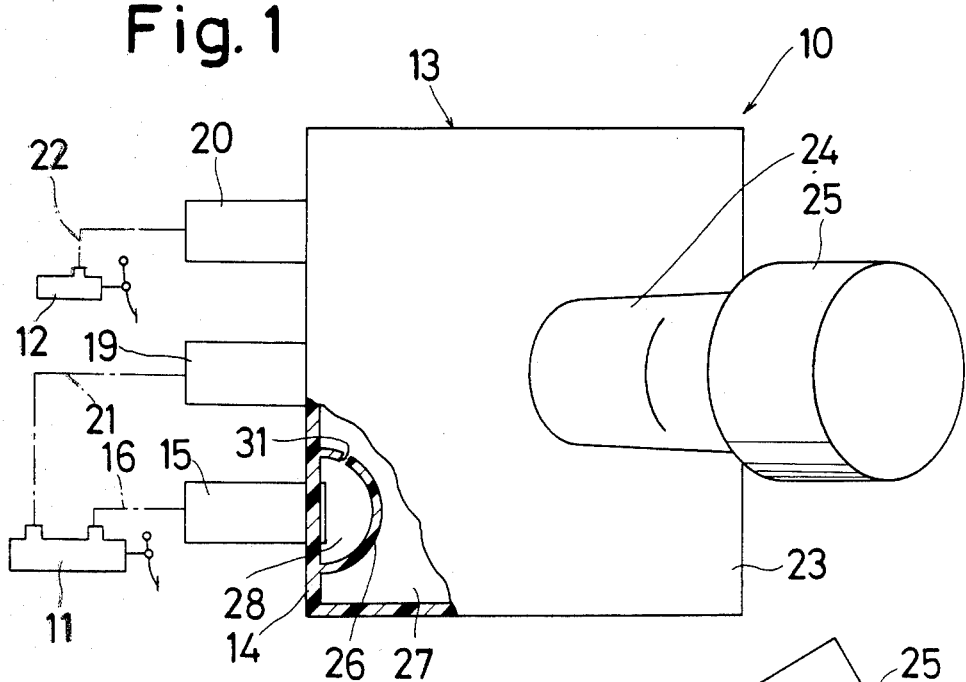
FIG. 1 is a partially broken plane view of an embodiment of a fluid reservoir according to the present invention.
Figure 2:
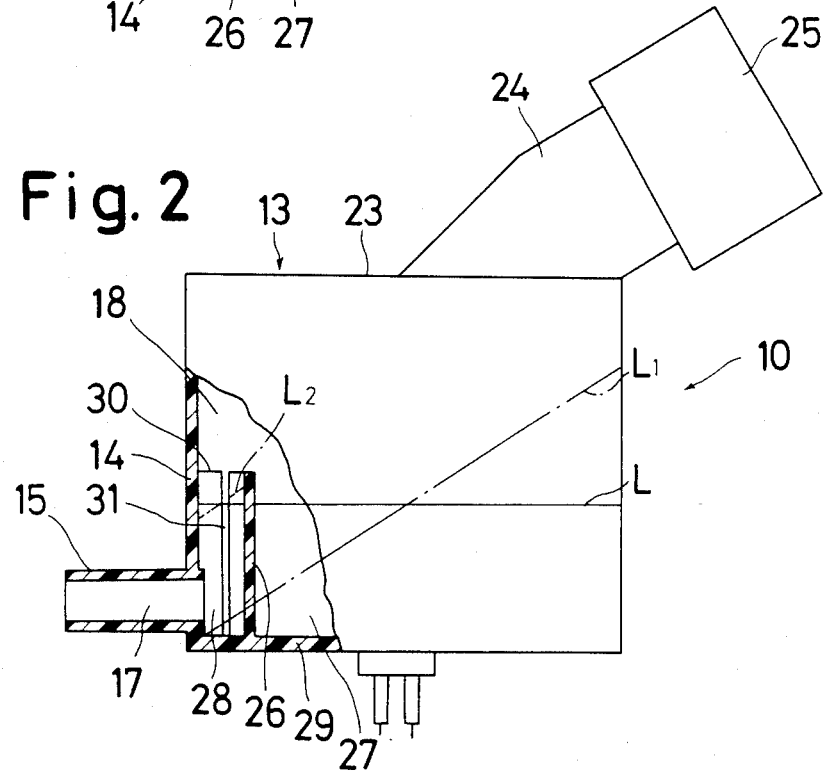
FIG. 2 is a partially broken side view of the embodiment shown in FIG. 1.

Referring to FIGS. 1 and 2, a fluid reservoir 10 for supplying fluids to a tandem brake master cylinder 11 and a clutch release master cylinder 12 comprises a reservoir tank 13 which is made of synthetic resin and is shaped in a rectangular configuration. Reservoir tank 13 is provided at a lower portion of peripheral wall 14 thereof with a tubular portion 15 for connection with a connecting tube 16. Tubular portion 15 defines an outlet 17 therein for supplying fluid within a fluid chamber 18 of reservoir tank 13 to master cylinder 11 via connecting tube 16.

Reservoir tank 13 is further provided at a lower portion of peripheral wall 14 thereof with two tubular portions 19 and 20 for connection with connecting tubes 21 and 22, respectively. Tubular portions 19 and 20 define outlets, not shown, therein respectively for supplying fluids within corresponding fluid chambers, not shown, of reservoir tank 13 to master cylinders 11 and 12, respectively.

Reservoir tank 13 is provided at an upper wall 23 thereof with a tubular portion 24 for defining an inlet for filling fluids into three fluid chambers of resevoir tank 13. A cap 25 is attached to a top of tubular portion 24.

According to the present invention, a partition wall 26 is provided within reservoir tank 13 for dividing fluid chamber 18 into larger and smaller chambers 27 and 28, respectively. Partition wall 26 is secured to peripheral wall 14 and bottom wall 29 of reservoir tank 13 so that smaller chamber 28 is in free fluid communication with outlet 17 and is in free fluid communication at top thereof with larger chamber 27. Such free fluid communication among outlet 17, smaller chamber 28 and larger chamber 27 brings satisfactory fluid flowing between outlet 17 and larger chamber 27 when a fluid level in the chamber 28 is above a top 30 of partition wall 26.

Top 30 of partition wall 26 is positioned above a predetermined lower fluid level shown by a line L in FIG. 2. Partition wall 26 has a slit 31 which extends downward from the top of partition wall 26 and this slit 31 functions as passage for establishing a restricted normal fluid communication between larger and smaller chambers 27 and 28 to ensure a minimum fluid flowing between outlet 17 and larger chamber 27 through smaller chamber 28.

Partition wall 26 has a cross-section in a half-circle a diameter of which is smaller than any lengths of larger chamber 27 in FIG. 1 and, therefore, smaller chamber 28 is much smaller that larger chamber 27 in both longitudinal and transverse directions of a vehicle, not shown. Thus, even when fluid level at L within larger chamber 27 will be varied to at $L_1$, fluid level at L within smaller chamber 28 will be varied to at $L_2$ thereby to prevent air within reservoir tank 13 from entering into outlet 17.

Fluid chamber for outlet defined by tubular portion 19 will be provided by partition wall similar to partition wall 26 and fluid chamber for outlet defined by tubular portion 20 also may be provided by partition wall similar to partition wall 26 according to requirement.

Reservoir tank 13, tubular portions 15, 19, 20, 24 and partition walls are preferably formed as one piece to reduce manufacturing cost.

It should be noted that fluid passage formed in partition wall 26 may be formed as plurality of small holes.

Obviously, numerous modifications and variations of the present invention are possible in light of above teachings. It is therefore to be understood that within the scope of the appended claims, the invention may be practiced otherwise than as specifically described herein.

What is claimed is:

1. A fluid reservoir for supplying fluid to master cylinder means arranged in hydrulic system means of an automotive vehicle comprising:

a reservoir tank having at least one fluid chamber therein and provided at a lower portion thereof with at least one outlet being offset from a center of said fluid chamber for supplying the fluid within said chamber to said master cylinder means;

partition means positioned within said reservoir tank for dividing said fluid chamber into larger and smaller fluid chambers, said smaller fluid chamber being in free fluid communication with said outlet and being in free fluid communication at a top thereof with said larger chamber, and said smaller chamber being much smaller than said larger chamber in both longitudinal and transverse directions of said vehicle; and passage means formed in said partition means for establishing a restricted normal fluid communication between said larger and smaller chambers; and said outlet being positioned at a peripheral wall portion of said reservoir tank, and said partition means being a partition wall secured to said peripheral wall and a bottom wall portion of said reservoir, said passage means being formed as a slit extending downward from said top of said partition wall, said reservoir tank and said partition wall being made of synthetic resin and being formed as one piece, said partition wall being shaped in a half-circle cross section.

2. A fluid reservoir for supplying fluid to master cylinder means arranged in hydraulic system means of an automotive vehicle comprising;

a reservoir tank having at least one fluid chamber therein and provided at a lower portion thereof with at least one outlet being offset from a center of said fluid chamber for supplying the fluid within said chamber to said master cylinder means;

partition means positioned within said reservoir tank for dividing said fluid chamber into larger and smaller fluid chambers, said smaller fluid chamber being in free fluid communication with said outlet and being in free fluid communication at a top thereof with said larger chamber, and said smaller chamber being much smaller than said larger chamber in both longitudinal and transverse directions of said vehicle;

passage means formed in said partition means for establishing a restricted normal fluid communication between said larger and smaller chambers; and said outlet being positioned at a peripheral wall portion of said reservoir tank, said partition means being a partition wall secured to said peripheral wall and a bottom wall portion of said reservoir, a top of said partition wall being positioned above a predetermined lower fluid level, said passage means being formed as a slit extending downward from said top of said partition wall, said reservoir tank and said partition wall being made of synthetic resin and being formed as one piece, and said partition wall being shaped in a half-circle cross section.

* * * * *